United States Patent [19]
Sandoz et al.

[11] 3,805,593
[45] Apr. 23, 1974

[54] LEAK DETECTOR

[75] Inventors: Paul H. Sandoz; Albert R. Uhlig, both of Toledo, Ohio

[73] Assignee: Owens-Illinois Inc., Toledo, Ohio

[22] Filed: Feb. 16, 1971

[21] Appl. No.: 115,877

Related U.S. Application Data

[63] Continuation of Ser. No. 866,409, Aug. 29, 1969, abandoned, which is a continuation of Ser. No. 769,796, Oct. 23, 1968, abandoned.

[52] U.S. Cl. ............................ 73/49.2, 73/41
[51] Int. Cl. ............................ G01m 3/32
[58] Field of Search ............ 73/37, 45, 45.1, 45.2, 73/49.2, 49.4, 41; 60/54.5; 92/5

[56] References Cited
UNITED STATES PATENTS

| | | | |
|---|---|---|---|
| 3,683,677 | 8/1972 | Harris | 73/49.2 |
| 1,316,549 | 9/1919 | Winkley | 73/45.1 |
| 3,010,310 | 11/1961 | Rowe | 73/45 |
| 2,880,610 | 4/1959 | McCoy | 73/49.2 |
| 2,606,657 | 8/1952 | Berthesen | 73/45.1 X |
| 3,374,887 | 3/1968 | Paruolo et al. | 73/37 X |

*Primary Examiner*—Richard C. Queisser
*Assistant Examiner*—Daniel M. Yasich
*Attorney, Agent, or Firm*—Philip M. Rice; E. J. Holler

[57] ABSTRACT

A method and apparatus is provided for detecting leaks in plastic bottles. The device is capable of testing plastic bottles for leaks without relying upon an outside source of air to pressurize the bottle being tested. The bottle to be tested is grasped by a neck engaging mechanism and lifted from its support into engagement with a plug gauge connected to a free floating cylinder. Continued movement of the bottle by the neck grasping means causes such cylinder to move relative to a fixed piston and thereby exhausts air from the cylinder into the bottle through the plug to create a pressure in the bottle. Tapped into the system when the bottle is under pressure is a conventional detecting unit to detect the loss of air from the bottle, and hence, determine the presence of a leak.

10 Claims, 7 Drawing Figures

LEAK DETECTOR

CROSS REFERENCE TO RELATED APPLICATIONS

This application is a continuation of our copending application Ser. No. 866,409, filed Aug. 29, 1969, now abandoned, which is a continuation of Ser. No. 769,796 filed Oct. 23, 1968, now abandoned.

BACKGROUND OF THE INVENTION

In the forming of plastic bottles, problems are frequently encountered by the presence of minute pin holes in the bottles. Although not readily discernible to the eye, the presence of such pin holes is reason for rejecting the bottle.

Accordingly, it is necessary that plastic bottles be tested to determine whether such bottles have pin holes which would present problems if the bottle were used for packaging goods. The bottles are customarily tested by introducing therein fluid pressure from an outside source and waiting a period of time to see whether such pressure is lost through pin holes contained in the bottle. The prior art devices have been fairly expensive and have generally required a source of compressed air or similar medium for introducing pressure into the bottle to be tested. Such prior art devices have been cumbersome to operate and have required excessive amounts of time to test individual bottles. Other prior art devices rely on measuring mechanical vibrations produced when a bottle subjected to fluid pressure leaks. Such device is described in U.S. Pat. No. 3,224,252.

It is an object of the present invention to provide a new and economical device for leak testing plastic bottles.

It is another object of the present invention to provide a leak detector which is completely self-contained and does not require an outside pressure source.

It is a further object of the present invention to provide a method for testing plastic bottles for leaks which is fast and yet which is extremely accurate.

Other objects and advantages of the present invention will become readily apparent from the following detailed description taken in conjunction with the annexed sheets of drawings on which:

Referring now to the drawings, there is provided a conveyor belt 10 on any suitable support mechanism 11 for conveying bottles B to the testing station. Positioned above the conveyor 10 is a leak tester generally designated by the numeral 20 supported on guide rods 21 extending upwardly from a frame 22. Secured to the tops of the respective guide rods 21 is a stationary platform 23 having mounted thereon a fluid pressure cylinder 24. Mounted on the guide rods 21 in slideable relationship thereto is a first movable platform 25 and a second movable platform 26. Each of the rods 21 has a collar 27 secured thereto for limiting the lowermost position of the second movable platform 26.

The fluid pressure cylinder 24 has a piston rod 28 extending therefrom, the free end of which is secured to the first movable platform 25. Mounted on the first movable platform 25 are a pair of compression springs 30 contained in housings 31 and which serve to urge the first and second movable platforms apart. Thus, when the first movable platform 25 is at its lowermost position and during its initial movement upward, the springs 30 serve to hold the second movable platform 26 in a stationary position at its lowermost position. Secured to the second movable platform 26 and extending through the first movable platform in slideable relationship thereto are a pair of stop pins 32 having enlarged heads 33. When the first movable platform 25 is moved to a position at which it contacts the enlarged heads 33, any continued upward movement of such first movable platform 25 will serve to draw with it the second movable platform 26.

Secured to the first movable platform are a pair of cams 34 each having a first vertical face 35, a second face 36 extending downwardly and inwardly therefrom and a third face 37 extending vertically downwardly from the second face 36.

Figure 2:
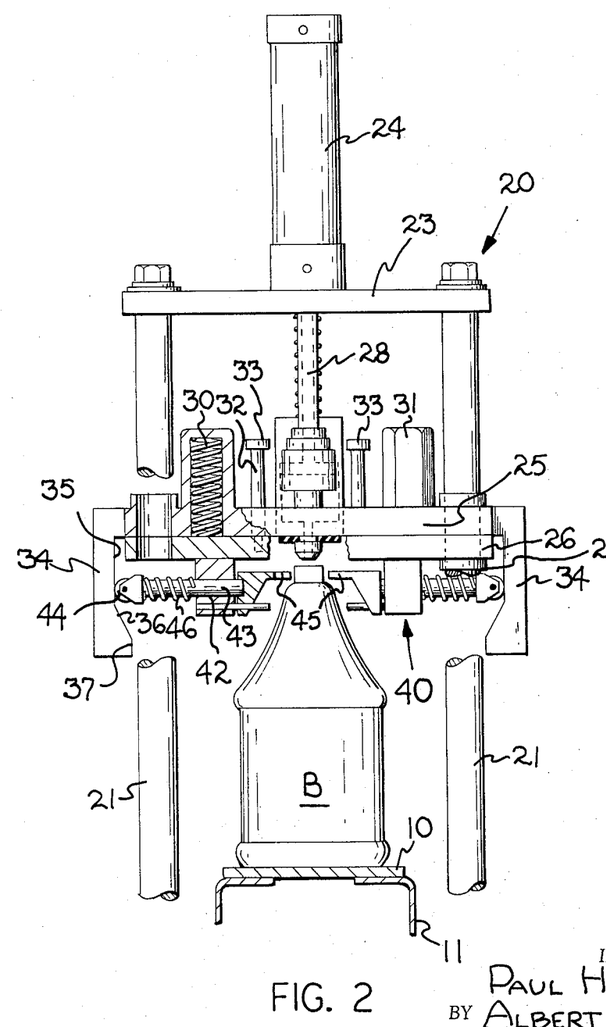
FIG. 2 is an elevational view thereof taken from the side opposite the handle of the jug or bottle illustrated in FIG. 1.

It has been determined that maximum accuracy is obtained if the bottle being tested is out of contact with any support members which would tend to deform the thin, flexible wall thereof. Accordingly, means are provided for supporting the bottles at the relatively rigid neck portions thereof. Such means include a neck grasping mechanism 40 secured to the bottom of the second movable platform 26 by means of support blocks 41. Each support block 41 has an aperture 42 for slideably receiving a movable pin 43. Each of the pins has a cam engaging wheel 44 mounted on one end and a neck gripping yoke 45 mounted on the other end. A compression spring 46 encircles each of the pins 43 and serves to urge the cam engaging wheels 44 against the respective cams 34. It can be readily seen from viewing FIGS. 2 and 3 that the neck gripping yokes 45 may be moved from a position out of engagement with the neck of the bottle B (FIG. 2) to a position in engagement with the neck of bottle B (FIG. 3) by actuating the fluid pressure cylinder 24 to lift the first movable platform 25 and thereby move the cams 34 relative to the cam engaging wheels 44. As the cam engaging wheels 44 engage the downwardly and inwardly inclined faces 36 of the respective cams 34, the pins 43 are urged inwardly to cause the neck gripping yokes 45 to engage the neck of the bottle B.

Figure 3:
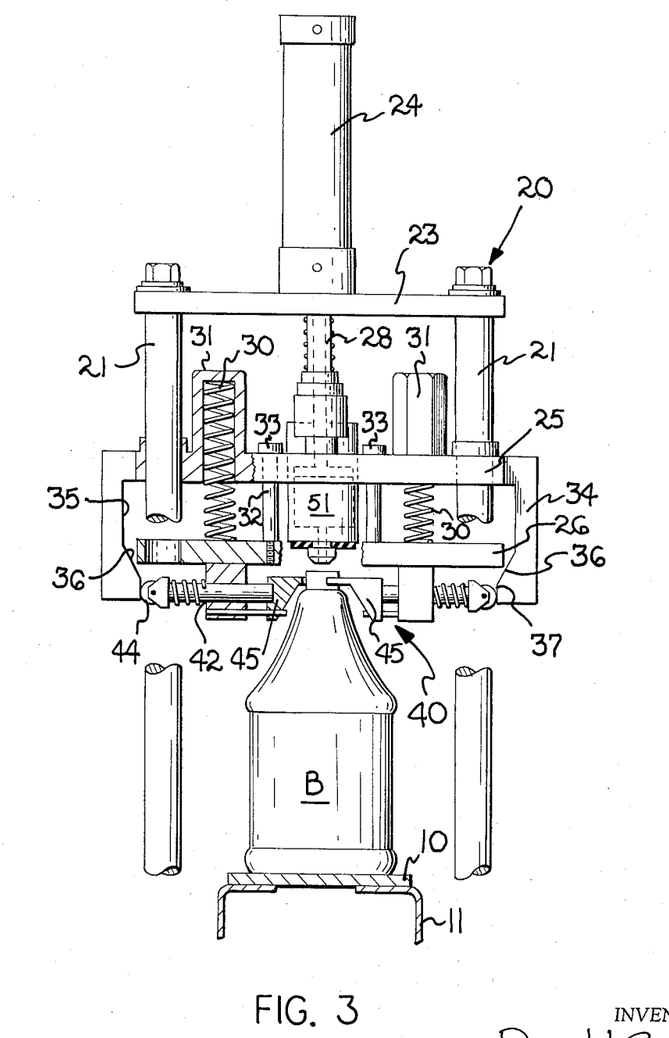
FIG. 3 is a view similar to FIG. 2 showing the apparatus moved to a position at which the neck grasping mechanism is in engagement with the neck of the bottle to be tested.
Figure 4:
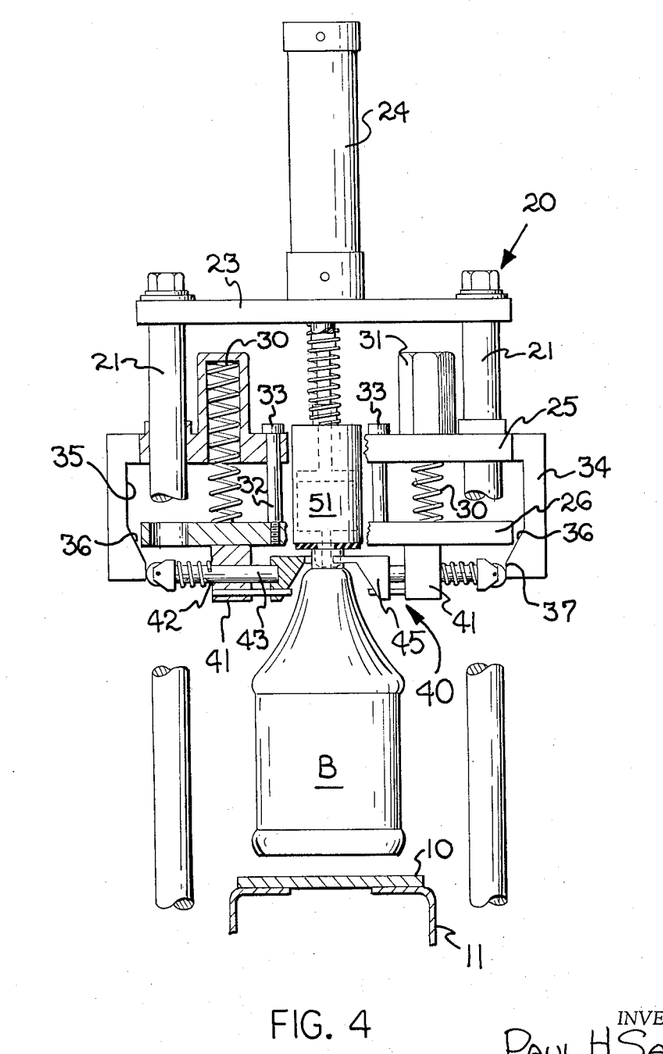
FIG. 4 is a view similar to FIG. 3 with sections broken away showing the apparatus moved to the next operative position at which the bottle to be tested is lifted from its support member.
Figure 5:
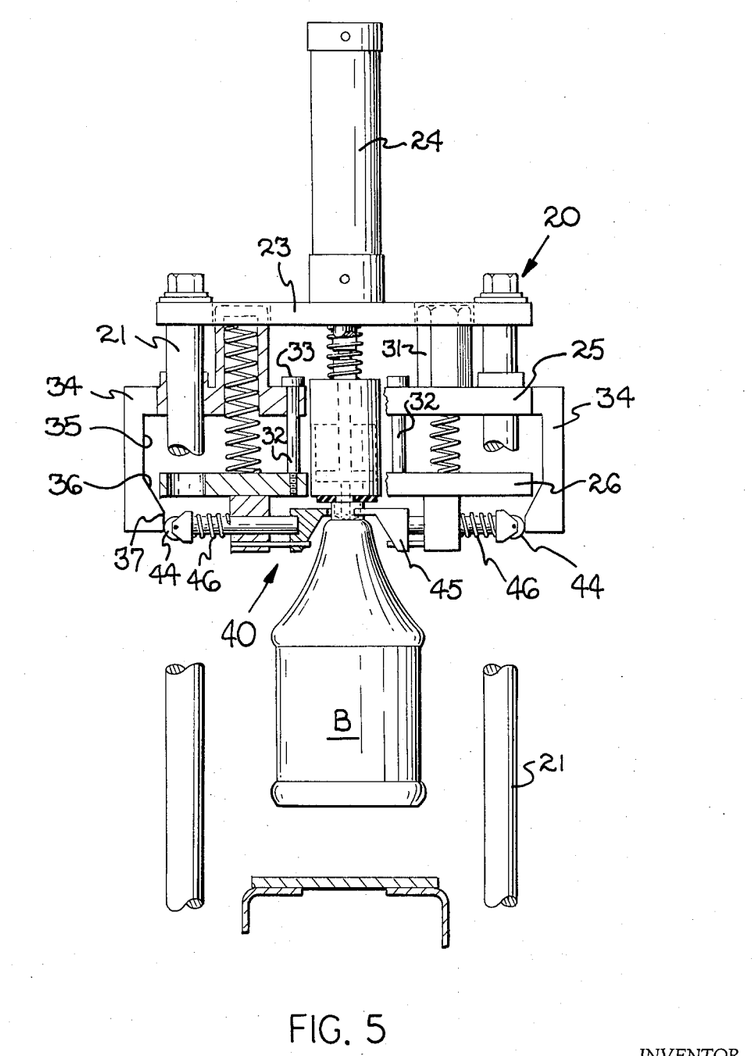
FIG. 5 is a view similar to FIG. 4 showing the apparatus in the next operative position at which the bottle is subject to pressure.

It can be further seen by viewing FIGS. 3 and 4 that continued upward movement of the first movable platform 25 by means of the fluid pressure cylinder 24 causes such platform to engage the enlarged heads 33 of the stop pins 32 and thereby draw with it the second movable platform 26 and the engaged bottle B.

Figure 1:
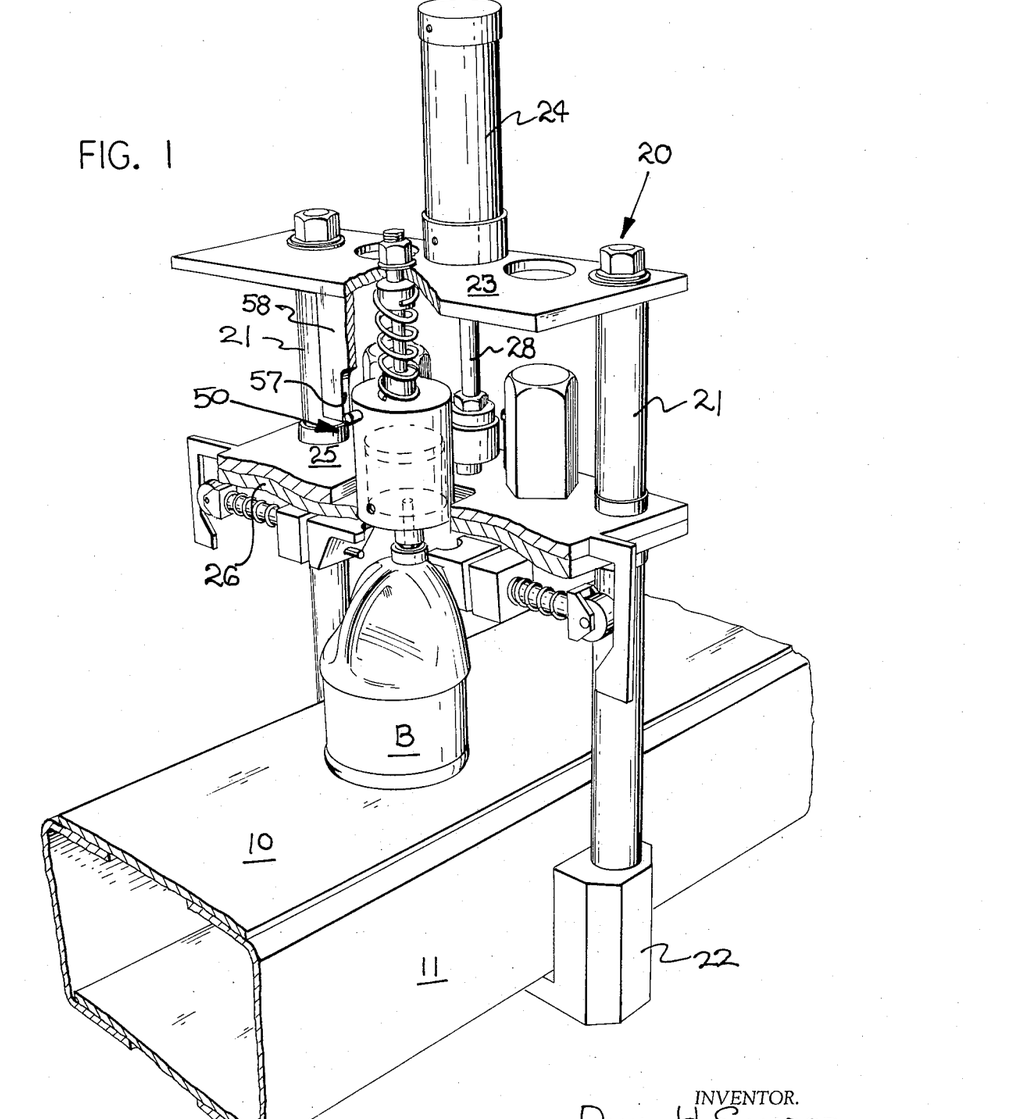
FIG. 1 is a perspective view illustrating the apparatus of the present invention.
Figure 6:
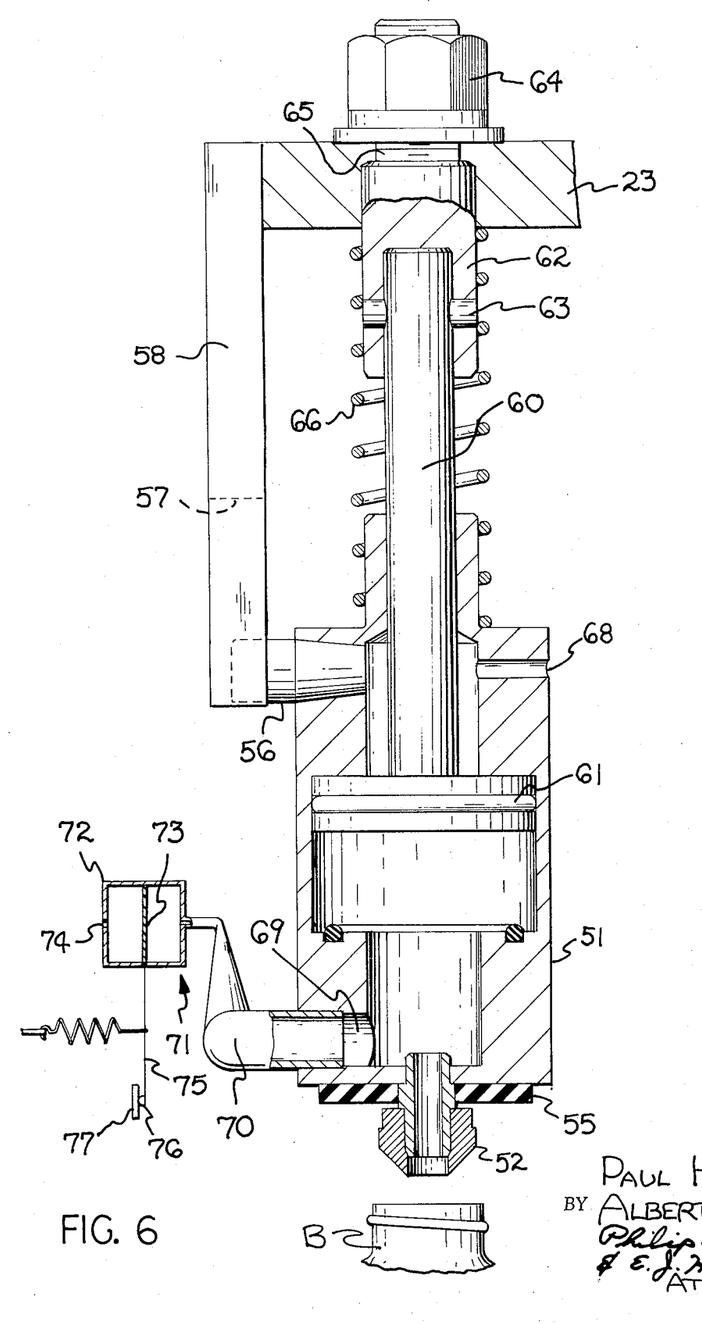
FIG. 6 is a sectional view of the plug and pressurizing mechanism of the present invention prior to engagement with a bottle.
Figure 7:
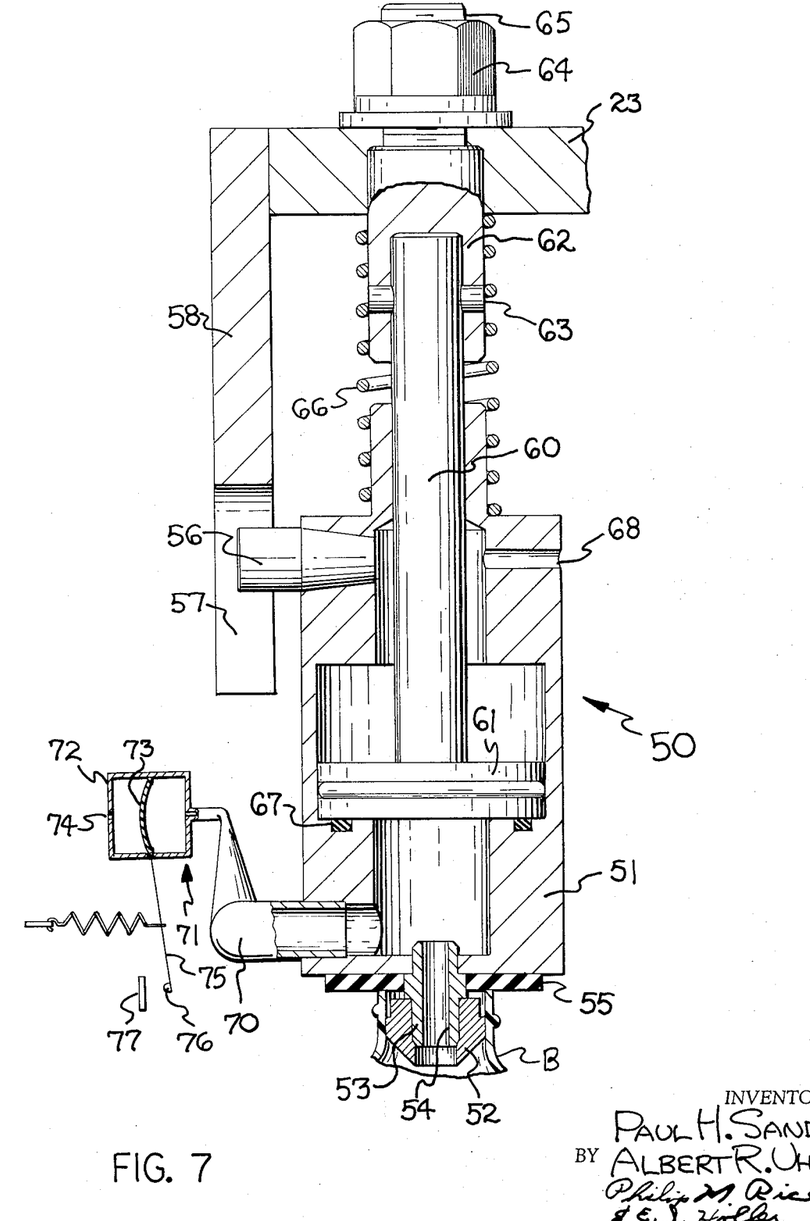
FIG. 7 is a view similar to FIG. 6 showing the position of the plug and pressurizing mechanism while the bottle is under pressure as illustrated in FIG. 5.

Referring now to FIGS. 1, 6 and 7, there is provided an air displacement assembly generally designated by the numeral 50 for introducing air into the bottle to be tested. The air displacement assembly 50 includes a cylindrical housing 51 having a plug gauge 52 mounted on the lower end thereof. The plug gauge 52 is sized to be snugly received in the neck of the bottle to be tested. The plug gauge 52 is secured to the lower end of the cylindrical housing 51 by means of a tubular element 53 having a passageway 54 therein providing communication between the cylindrical housing and the bottle in which the plug gauge 52 is positioned. A resilient rubber pad 55 is mounted on the tubular element 53 against the lower end of the cylindrical housing 51 and serves as a seal against which the open end of the bottle B being tested is urged. The cylindrical housing 51 is freely movable in a direction parallel to the axis of the bottle B to be tested and is guided in such movement by means of a pin 56 received in a slot 57 of guide member 58 which is secured to the stationary platform 23.

Rigidly secured to the stationary platform 23 is a piston rod 60 having a piston 61 snugly received in a cylindrical chamber of the cylindrical housing 51. The piston rod 60 is secured to the stationary platform by means of a collar 62 having a pin 63 secured thereto and passing through an aperture of the piston rod 60. A nut 64 and bolt 65 secures the collar to the stationary platform. A compression spring 66 encircles the piston rod 60 and serves to yieldingly urge the cylindrical housing 51 to the lowermost position permitted by the piston 61. Positioned in the cylindrical housing 51 is an annular gasket 67 which becomes sealingly engaged by the piston 61 when the housing 51 is raised to its uppermost position (FIG. 7).

The cylindrical housing 51 is provided with an upper aperture 68 leading to the atmosphere and a lower aperture 69 to which is connected a tube 70 leading to a conventional pressure sensing mechanism designated generally by the numeral 71. For example, the pressure sensing mechanism may be a Hays pressure switch, Model No. 212-100-01-C, having a range of 0-2 inches water manufactured by The Hays Corporation, Michigan City, Ind. The device includes a pressure switch 72 having a resilient diaphragm 73. The pressure switch 72 communicates with the tube 70 leading to one side of the diaphragm and communicates, on the other side of the diaphragm, with atmosphere, as by an aperture 74. Extending downwardly from the pressure switch 72 is a pendulum 75 having an enlarged end 76 which contacts a mercury switch 77 when the pressure on both sides of the diaphragm is equal. When pressure is introduced into a bottle and the pressure is retained therein, thereby indicating that the bottle is satisfactory, the pressure will also be communicated to the switch 72 through the tube 70, thereby causing the diaphragm to bulge outwardly toward the side of the pressure switch having the aperture 74 communicating with the atmosphere and will thereby cause the pendulum 75 to move in the opposite direction disengaging the enlarged end 76 from the mercury switch 77. If the enlarged head 76 remains disengaged from the mercury switch 77 for a predetermined period of time, on the order of 1 second, the bottle is deemed to be commercially satisfactory and is permitted to return to the conveyor 10. If the enlarged end returns to make contact with the mercury switch within the prescribed time, namely, 1 second, this indicates a bad bottle which must be rejected. The signaling and disposal of a rejected bottle may be handled in any one of several conventional ways. For example, if the enlarged end 76 makes contact with the mercury switch 77 within the prescribed period of time, a switch may be actuated to punch a large hole in the rejected bottle which will be clearly visible to the bottle inspectors or a delayed action ejector may be actuated to automatically knock the rejected bottle from the conveyor belt 10 when it reaches a predetermined position. Inasmuch as the means for ejecting a rejected bottle from the conveyor belt 10 is conventional, no further description of such ejecting means is necessary.

In operation, a bottle B to be tested is moved on the conveyor belt 10 to a position underlying the plug gauge 52 at which the neck of the bottle will be positioned between the neck gripping yokes 45. Pressured fluid is then directed to the lower end of the fluid pressure cylinder 24 to thereby cause retraction of the piston rod 28 therein, thus, lifting the first movable platform 25. As previously noted, such lifting causes the neck gripping yokes 45 to engage the neck of a bottle B by virtue of the cams 34 urging the pins 42 inwardly. After the neck gripping yokes 45 have gripped the neck of the bottle B, the first movable platform 25 engages the enlarged heads 33 of the stop pins 32 and serves to draw the second movable platform upwardly, drawing with it the gripped bottle B. Inasmuch as the cylindrical housing 51 is not connected with either of the platforms 25 or 26, it remains stationary while the bottle moves toward it. The neck of the bottle then telescopes around the plug gauge 52 with the upper rim of the neck becoming sealingly engaged to the rubber pad 55. Continued upward movement of the movable platforms 25 and 26 by the cylinder 24 causes the bottle B to urge the cylindrical housing 51 upwardly. Such upward movement of the housing 51 while the piston 61 positioned therein remains in its fixed position secured to the stationary platform 23 forces air contained within the chamber to be discharged to the interior of the bottle B through the passageway 54 of the tubular element 53. Such discharge of the air creates a very small pressure in the bottle, on the order of 2 inches of water, which is fed to the pressure switch 72 through the tube 70. Such pressure thus deflects the diaphragm 73 (FIG. 7) and, if deflected for the prescribed period of time, namely, 1 second, indicates that the bottle is satisfactory for commercial purposes from the standpoint of lack of pin holes. If, on the other hand, the bottle leaks, the diaphragm is permitted to return prematurely to the pressure-equalized position illustrated in FIG. 6. Such premature return causes the enlarged head 76 to engage the switch 77 and thereby signals that the bottle being tested is defective.

It can be seen from the foregoing that the present invention provides an economical and compact unit for the testing of plastic bottles for leaks resulting from small holes therein. Additionally, although utilizing the principle of pressure testing, it does not require an outside source of air pressure. It permits high speed testing of bottles and, yet, is extremely reliable.

Several modifications will become readily apparent to those skilled in the art.

We claim:

1. Apparatus for leak testing a plastic bottle having a neck portion comprising,
   a. a support member for the bottle,
   b. a fluid cylinder supported above the bottle and having (i) a piston positioned in the chamber thereof, (ii) a piston rod extending from one end thereof supporting said piston in a fixed relation to said support member, and (iii) a plug sized to fit within said neck portion joined exteriorly to the opposite end thereof, said plug having a passageway for directing air from said cylinder into said bottle,
   c. means for imparting relative movement between the bottle and the support member to (i) position the plug within the neck and (ii) move only the cylinder a predetermined distance relative to the piston and the support member to force a predetermined volume of air from within the cylinder through the plug and into said bottle,
   d. means for sealing the bottle while the plug is in the neck, and
   e. means communicating with the interior of said bottle through said plug for sensing the loss of pressure within the bottle.

2. Apparatus for leak testing a plastic bottle having a neck portion comprising,
   a. a support member for the bottle,
   b. a fluid cylinder supported above the bottle and having (i) a piston positioned in the chamber thereof, (ii) a piston rod extending from one end thereof supporting said piston in a fixed relationship to said support member, and (iii) means on the opposite end thereof for directing air from said cylinder into said bottle,
   c. means for sealing the bottle against said opposite end,
   d. means for imparting relative movement between the bottle and the support member to (i) sealingly engage the neck against said opposite end and (ii) move only the cylinder a predetermined distance relative to the piston and the support member to force a predetermined volume of air from within the cylinder into said bottle, and
   e. means communicating with said air directing means for sensing the loss of pressure within the bottle.

3. Apparatus for leak testing plastic bottles comprising,
   a. a support platform,
   b. a cylinder having a piston positioned therein and a piston rod extending from one end, said piston rod rigidly connected to said support platform,
   c. means yieldingly urging the cylinder away from said support platform,
   d. means on the other end of said cylinder for sealing said bottle and for introducing therein, air from the cylinder upon movement of the cylinder toward the support platform,
   e. first and second movable support members, said first movable support member carrying cam means thereon, said second movable support member carrying bottle gripping means thereon, said bottle gripping means contacting said cam means and being actuated to grip a bottle positioned therebetween upon movement of the cam means relative thereto,
   f. power means for moving said first movable support member relative to said second movable support member to close said bottle gripping means into engagement with a bottle positioned therebetween,
   g. means for lifting said second support member and said gripped bottle to move said bottle into engagement with said other end of the cylinder and for continuing the movement thereof to move the cylinder toward said platform thereby evacuating air from the cylinder into said bottle to create a pressure therein, and
   h. sensing means for determining the leakage of pressure from the bottle.

4. Apparatus for leak testing a hollow article having a neck portion defining an opening comprising
   a. a support member for supporting the article to be tested
   b. a test head positioned over said support member, said test head having sealing means to isolate the interior of said article from atmosphere
   c. means yieldably supporting said test head for movement along the axis of said neck portion from a normal lower position to an upper position
   d. means coacting with said means supporting said test head and engageable with said neck portion for moving said article into engagement with said test head and for continuing this movement to move said test head and said article upwardly together,
   e. means responsive to the combined movement of said article and test head for introducing pressure through said test head into said article and
   f. means communicating with the interior of said article through said test head for detecting the loss of pressure therein.

5. Apparatus for leak testing a hollow plastic article having a neck portion defining an opening comprising
   a. a support member for supporting said article,
   b. a self-contained unit having a chamber for holding a supply of air,
   c. means for sealing said opening,
   d. means for lifting said article, said means including first and second moveable platforms, said first moveable platform having cam means mounted thereon, said second platform having neck grasping means actuatable to engage said article neck portion on movement of said cam means relative thereto, means for moving said first moveable platform and said cam means relative to said neck grasping means, and means for moving said second moveable platform relative to said support member when the article is engaged by the neck grasping means,
   e. means responsive to the lifting of said article for evacuating air from said chamber when the article is sealed,
   f. communication means for directing air evacuated from said chamber through said sealing means into said article, and
   g. means communicating with said air directing means for sensing the loss of pressure within the article.

6. Apparatus for leak testing a plastic bottle having a neck portion comprising,
   a. a support member for the bottle, b. means for supplying air under pressure to the bottle being tested and supported above the bottle, said means including (i) a variable-sized chamber for containing a supply of air, (ii) means responsive to relative movement between said support member and said chamber for reducing the size of said chamber to evacuate air therefrom, and (iii) means for directing air evacuated from said chamber into the bottle, c. sealing means for sealing said bottle to retain the air directed therein from said chamber, d. means for imparting relative movement between the bottle and said support member to (i) sealingly engage the neck with said sealing means and to (ii) move said chamber relative to said support member to force a predetermined quantity of air from within said chamber into said bottle, said means for imparting relative movement between the bottle and said support member including (i) a movable platform, said platform having cam actuated neck grasping means mounted thereon actuatable to engage said bottle neck portion, (ii) cam means for actuating said neck grasping means upon movement of said platform to engage the bottle neck portion, and (iii) means for moving said platform and said bottle relative to said support member when said bottle is engaged by said neck grasping means, and e. means communicating with said air directing means for sensing the loss of pressure within the bottle.

7. The apparatus as defined in claim 6 wherein said neck grasping means is operable to support the bottle solely by the neck thereof during the pressure testing operation.

8. The apparatus as defined in claim 6 wherein said neck grasping means is supported for movement relative to said platform, said apparatus further comprising stop means for limiting said relative movement between said platform and said neck grasping means, said stop means interconnecting said platform and said neck grasping means for simultaneous movement upon reaching the limit of said limited relative movement.

9. An apparatus for leak testing a plastic bottle having a neck portion comprising, a. a support member for the bottle, b. means for supplying air under pressure to the bottle being tested and supported above the bottle, said means including (i) a variable sized chamber for containing a supply of air, (ii) means responsive to relative movement between said support member and said chamber for reducing the size of said chamber to evacuate air therefrom, and (iii) means for directing air evacuated from said chamber into the bottle, c. sealing means for sealing said bottle to retain the air directed therein from said chamber, d. means for imparting relative movement between the bottle and said support member to (i) sealingly engage the neck with said sealing means and to (ii) move said chamber relative to said support member to force a predetermined quantity of air from within said chamber into said bottle, said means for imparting relative movement between the bottle and said support member including (i) first and second movable platforms, said first movable platform having cam means mounted thereon, said second platform having neck grasping means actuatable to engage said bottle neck portion upon movement of said cam means relative thereto, (ii) means for moving said first movable platform and said cam means relative to said neck grasping means, and (iii) means for moving said second movable platform relative to said support member when the bottle is engaged by said neck grasping means, and e. means communicating with the interior of said bottle through said sealing means for sensing the loss of pressure within the bottle.

10. The apparatus as defined in claim 9 further including stop means for limiting the movement of said movable platforms away from said one another, spring means urging said second movable platform against said stop means during that portion of the movement of said first movable platform which actuates the engagement of said neck grasping means with said neck portion, said stop means interconnecting said platforms to draw said second platform with the first when the neck portion is engaged by the neck grasping means.

* * * * *